US012447768B2

(12) United States Patent
Kim

(10) Patent No.: US 12,447,768 B2
(45) Date of Patent: Oct. 21, 2025

(54) CANVAS FIXING DEVICE FOR ALUMINUM CANVAS FRAME

(71) Applicant: Ki Bum Kim, Gyeongsangbuk-do (KR)

(72) Inventor: Ki Bum Kim, Gyeongsangbuk-do (KR)

( * ) Notice: Subject to any disclaimer, the term of this patent is extended or adjusted under 35 U.S.C. 154(b) by 200 days.

(21) Appl. No.: 18/386,632

(22) Filed: Nov. 3, 2023

(65) Prior Publication Data

US 2024/0239133 A1 Jul. 18, 2024

(30) Foreign Application Priority Data

Jan. 18, 2023 (KR) ........................ 10-2023-0007045

(51) Int. Cl.
*B44D 3/18* (2006.01)

(52) U.S. Cl.
CPC .................................... *B44D 3/185* (2013.01)

(58) Field of Classification Search
CPC .................................. B44D 3/185; B44D 3/18
USPC ....................................................... 38/102.91
See application file for complete search history.

(56) References Cited

U.S. PATENT DOCUMENTS 2,456,225 A * 12/1948 Thomas ................. B44D 3/185 160/402
4,097,968 A * 7/1978 Pikus ........................ D06C 3/10 38/102.91
4,161,977 A * 7/1979 Baslow ................ A47G 1/0605 403/231
4,194,312 A * 3/1980 Connors .................. D06C 3/08 40/792
4,986,332 A * 1/1991 Lanuza ................... E06B 9/521 428/904.4
5,115,584 A * 5/1992 Lucchetti ............... B44D 3/185 38/102.91
6,574,936 B1 * 6/2003 Anderson, Sr. ........ B44D 3/185 52/273
11,684,185 B2 * 6/2023 Spiro .................. A47G 1/0605 40/700
11,731,454 B2 * 8/2023 Hong ..................... B44D 3/185 38/102.1
2006/0101759 A1 * 5/2006 Bihr ....................... B44D 3/185 52/417
2017/0151772 A1 * 6/2017 Spiro ....................... D06C 3/08
2018/0072093 A1 * 3/2018 Roy ......................... B44D 3/18

(Continued)

FOREIGN PATENT DOCUMENTS

KR 101226698 1/2013
KR 20210121953 10/2021

*Primary Examiner* — Kristina R Fulton
(74) *Attorney, Agent, or Firm* — IPLA P.A.

(57) ABSTRACT

A canvas fixing device for an aluminum canvas frame includes: canvas frame bodies each made of a lightweight metal, a fixing groove formed on the rear surface thereof and having a support protrusion, a coupling groove formed on the rear surface thereof, and a support wall formed between the fixing groove and the coupling groove and having a lower height than the rear wall thereof; and fixing pins molded with a thin plate and having a fixing protruding portion and wedge-shaped protrusions formed on top side thereof and an elastic portion bentedly formed on bottom side thereof, the elastic portion having a support piece formed by bending the bottom of the fixing pin, an elastic piece formed by bending the end of the support piece, and an extension protrusion extending from the elastic piece and having a locking projection protruding therefrom.

6 Claims, 4 Drawing Sheets

(56) References Cited

U.S. PATENT DOCUMENTS

| | | | | |
|---|---|---|---|---|
| 2024/0239133 | A1* | 7/2024 | Kim | B44D 3/185 |
| 2024/0246355 | A1* | 7/2024 | Kim | B44D 3/18 |

* cited by examiner

CANVAS FIXING DEVICE FOR ALUMINUM CANVAS FRAME

BACKGROUND

The present invention relates to a canvas fixing device for an aluminum canvas frame, more particularly, to a canvas fixing device for an aluminum canvas frame that is capable of fixing canvas to the aluminum canvas frame by means of elastic pins, without any use of wood.

Generally, painting such as western painting or oil painting is made on oil painting canvas as a kind of fabric that is fixed to a canvas frame.

That is, the outer edges of the canvas stretch out and are thus fixed to the canvas frame to a state where the canvas is kept tightly pulled, and in this case, nails, staples, thumbtacks, etc. are used as means for fixing the canvas to the square canvas frame.

To allow the nails, staples, and thumbtacks to easily hit into the canvas frame, generally, the conventional canvas frame is made of wood, but the wood canvas frame may be varied in moisture content according to the humidity in the air and thus easily distorted in shape. Further, the moisture contained in the wood is discharged according to external environments, and in this case, wood resin is discharged together with the moisture and soaks into the canvas, thereby causing the painting to be damaged.

That is, the canvas frame and the canvas stick together on a portion where they are brought into close contact with each other by means of the moisture discharged from the wood, so that molds are created from the portion, thereby seriously degrading the value of the painting.

To solve such problems the wood canvas frame has had, accordingly, various canvas frames made of aluminum as a lightweight metal have been recently proposed, which are suggested in Korean Patent No. 1226698 and Korean Patent No. 2319322. Referring to the conventional technologies, a canvas frame includes a square frame body made by connecting horizontal and vertical bars each having a pipe structure made of a lightweight metal and having a hollow portion formed therein and wood fixed to the edges of the rear surface of the square frame body.

Accordingly, canvas on which painting is made comes into close contact with the front surface of the canvas frame made of the metal, and the outer edges of the canvas are fixed to the wood located on the rear surface of the canvas frame, so that since the canvas on which the painting is made is brought into contact with the front surface of the canvas frame made of the metal, it is safely spaced from the molds created due to the moisture discharged from the wood and the resin discharged from the wood, thereby lowering a degree of contamination thereof.

However, the wood for fixing the canvas frame or the canvas still exists in the conventional technologies, and accordingly, the conventional technologies just have a difference in the degree of contamination and contamination time from the existing wood canvas frame. As time passes, therefore, moisture, resin, and molds may come from the wood located on the rear surface of the canvas frame, and they gradually spread to the front surface of the canvas so that the painting becomes contaminated.

Patent literatures: Korean Patent No. 1226698, and Korean Patent No. 2319322.

SUMMARY OF THE INVENTION

Accordingly, the present invention has been made in view of the above-mentioned problems occurring in the related art, and it is an object of the present invention to provide a canvas fixing device for an aluminum canvas frame that is capable of directly fixing canvas to the aluminum canvas frame by means of metal pins, without any use of wood.

It is another object of the present invention to provide a canvas fixing device for an aluminum canvas frame that is capable of rigidly fixing canvas to the aluminum canvas frame and simply fixing and separating the canvas to and from the aluminum canvas frame.

Technical Solution

To accomplish the above objects, according to the present invention, there is provided a canvas fixing device for an aluminum canvas frame, including: canvas frame bodies each made of a lightweight metal by means of extrusion molding and having a hollow portion formed therein, a fixing groove formed on the rear surface thereof and having a support protrusion protruding from top side inlet thereof, a coupling groove formed on the rear surface thereof under the fixing groove and having a locking protrusion, and a support wall formed between the fixing groove and the coupling groove and having a lower height than the rear wall thereof; and a plurality of fixing pins molded with a thin plate and having a fixing protruding portion and a plurality of wedge-shaped protrusions formed on top side thereof and an elastic portion bentedly formed on bottom side thereof, the elastic portion having a support piece formed by bending the bottom of the fixing pin, an elastic piece formed by bending the end of the support piece, and an extension protrusion extending from the elastic piece and having a locking projection protruding therefrom, wherein the wedge-shaped protrusions of each fixing pin are pressurized against the canvas on the outside of the outer edge of the canvas surrounding the corresponding canvas frame body and pierce the canvas, so that the ends of the wedge-shaped protrusions are exposed from the other side of the canvas and inserted into the fixing groove, and the elastic portion of each fixing pin is inserted into the coupling groove to allow the locking projection of the fixing pin to be locked onto the locking protrusion, thereby allowing the canvas to be fixed to the aluminum canvas frame.

According to the present invention, the canvas fixing device for the aluminum canvas frame is configured to allow the canvas frame bodies 1 cut to an appropriate size to be first coupled to one another to make the rectangular canvas frame in such a way as to have the fixing grooves and the coupling grooves exposed to the outside on the rear surface of the canvas frame, and while the outer edges of the canvas surrounded on the canvas frame are being pulled, next, the wedge-shaped protrusions of each fixing pin are pressurized against the canvas on the outside of the canvas and pierce the canvas so that the ends of the wedge-shaped protrusions exposedly protrude from the other side of the canvas and are inserted into the fixing groove. After that, if the elastic portion of each fixing pin is inserted into the coupling groove to allow the locking projection of the fixing pin to be locked onto the locking protrusion, the ends of the wedge-shaped protrusions exposed to the other side of the canvas are locked onto the support protrusion so that the canvas is fixed to the canvas frame, without any use of the wood for fixing the canvas to the aluminum canvas frame.

DETAILED DESCRIPTION OF THE INVENTION

Hereinafter, the present invention will be explained in detail with reference to the attached drawings.

Figure 1:
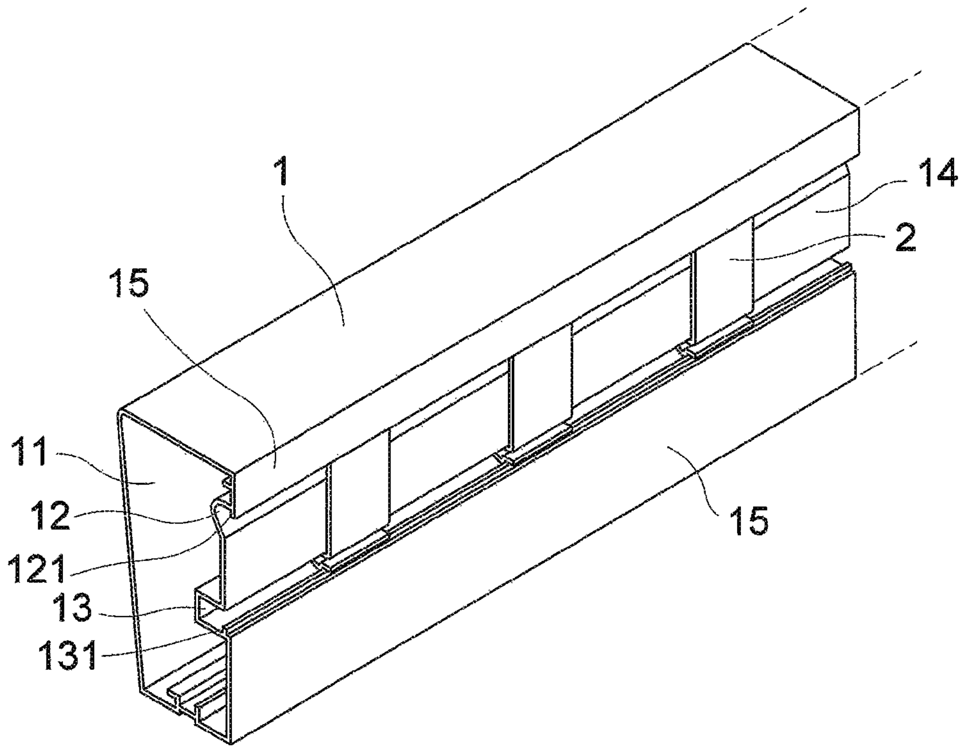
FIG. 1 is a perspective view showing a canvas fixing device for an aluminum canvas frame according to the present invention, wherein fixing pins are coupled to a canvas frame body.

FIG. 1 is a perspective view showing a canvas fixing device for an aluminum canvas frame according to the present invention, wherein fixing pins are coupled to a canvas frame body.

According to the present invention, a canvas frame body 1 is made by means of extrusion molding and has a hollow portion 11 formed therein and a fixing groove 12 and a coupling groove 13 exposedly formed on the rear surface thereof.

The fixing groove 12 desirably has the shape of a semi-circle with a rear inlet or the shape of a trapezoid with one side slant surface, and further, the fixing groove 12 has a support protrusion 121 protruding from top side inlet thereof.

The coupling groove 13 desirably has the shape of a rectangle with a rear inlet in such a way as to be adjacent to the fixing groove 12 under the fixing groove 12, and further, the coupling groove 13 has a locking protrusion 131 protruding from bottom side inlet thereof.

The fixing groove 12, the coupling groove 13, the support protrusion 121, and the locking protrusion 131 are formed continuously along the longitudinal direction of the canvas frame body 1, and the fixing groove 12 and the coupling groove 13 are connected to each other by means of a support wall 14. The support wall 14 is located at a lower height than a frame wall 15 as a rear wall of the canvas frame body 1, and the support protrusion 121 and the locking protrusion 131 are formed to face each other on the ends of the frame wall 15 as the outsides of the fixing groove 12 and the coupling groove 13 to which the support wall 14 is connected.

Figure 3:
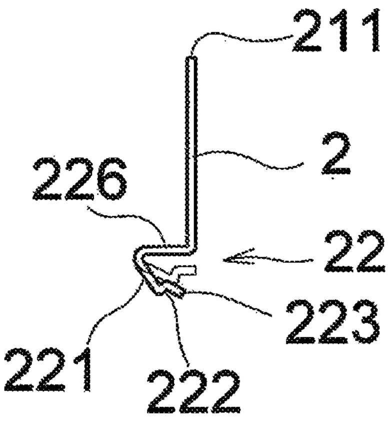
FIG. 3 is a side view showing the fixing pin of the canvas fixing device according to the present invention.
Figure 4A:
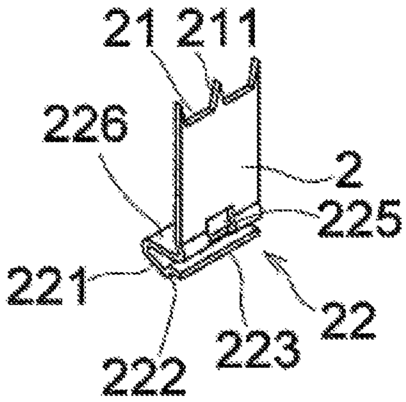
FIGS. 4A and 4B are perspective views showing other examples of the fixing pin of the canvas fixing device according to the present invention.
Figure 4B:
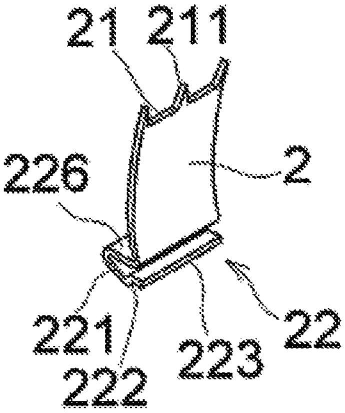

FIGS. 3 to 4B show the fixing pin of the canvas fixing device according to the present invention.

The fixing pin 2 is molded with a thin plate having elasticity and has a fixing protruding portion 21 and a plurality of wedge-shaped protrusions 211 formed on a top side thereof and an elastic portion 22 bentedly formed on a bottom side thereof.

The fixing protrusion portion 21 is top side end of the fixing pin 2 made of the thin plate and has the plurality of wedge-shaped protrusions 211 protruding sharply therefrom, as shown in FIG. 4A.

The elastic portion 22 has a support piece 226 formed by bending the bottom of the fixing pin 2 and an elastic piece 221 formed by bending the end of the support piece 226 so that a bent portion between the support piece 226 and the elastic piece 221 has given elasticity.

Further, the elastic portion 22 has an extension protrusion 223 formed by extending the elastic piece 221 in such a way as to have a locking projection 222 protruding therefrom. Further, a removal hole 225 is formed on the bent portion adapted to form the support piece 226 of the fixing pin 2, as shown in FIG. 4A, and otherwise, a body of the fixing pin 2 is bentedly formed, as shown in FIG. 4B.

Figure 5:
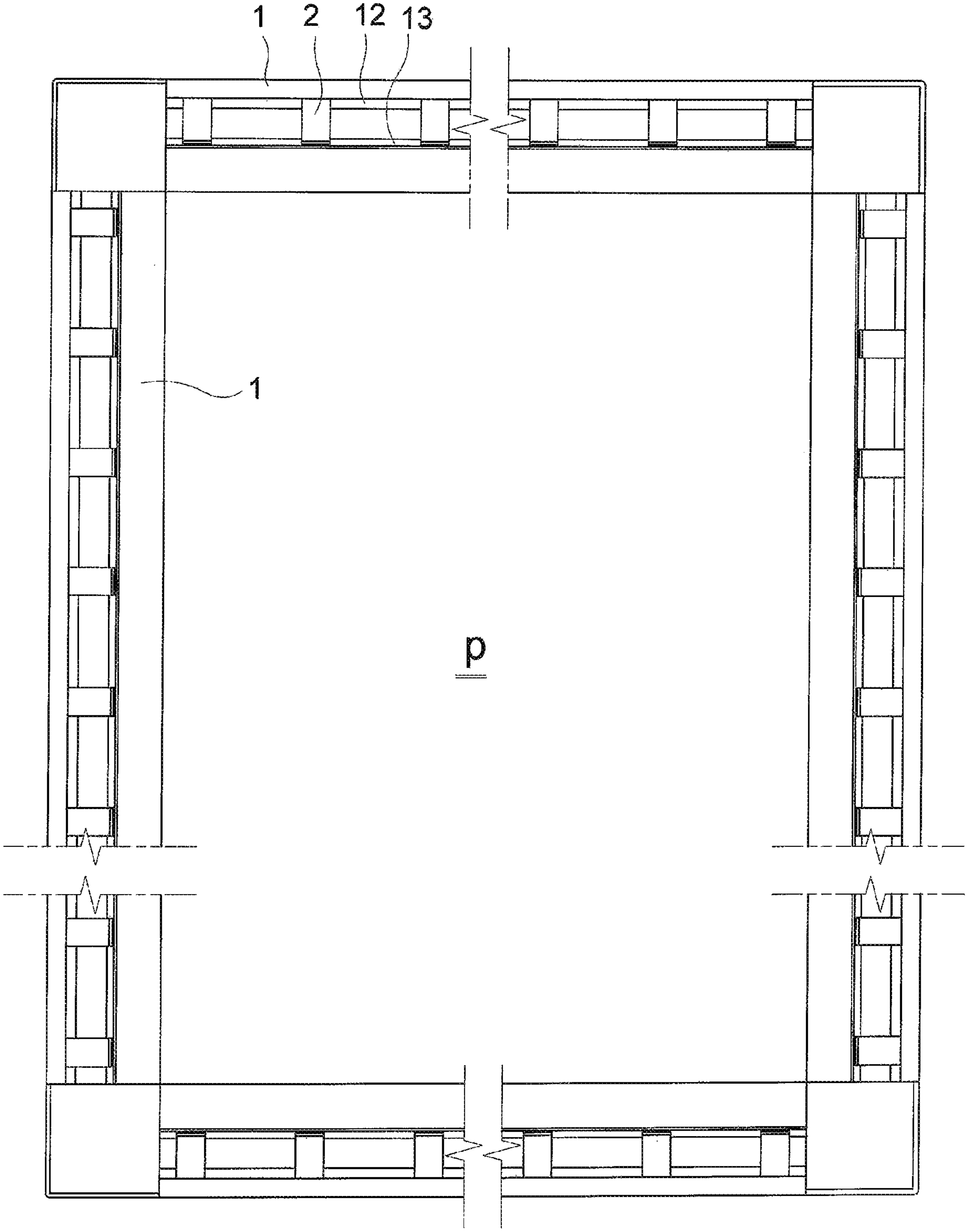
FIG. 5 is an exemplary view showing the canvas frame made with the canvas fixing device according to the present invention.

Under the above-mentioned configuration, the canvas frame bodies 1 cut to an appropriate size are first coupled to one another to make a rectangular canvas frame P as shown in FIG. 5, and next, the fixing pins 2 are coupled to the canvas frame bodies 1 on the rear surface of the canvas frame P to fix the canvas 3 to the canvas frame P.

Figure 2A:
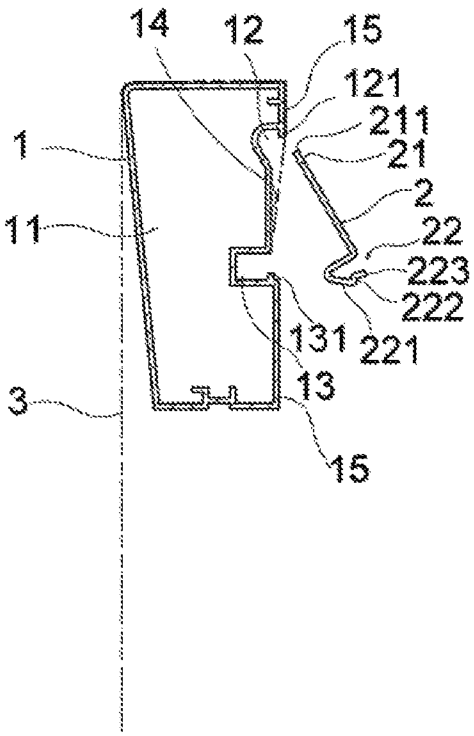
FIGS. 2A and 2B are sectional views showing states where canvas is fixed to the canvas frame body according to the present invention.
Figure 2B:
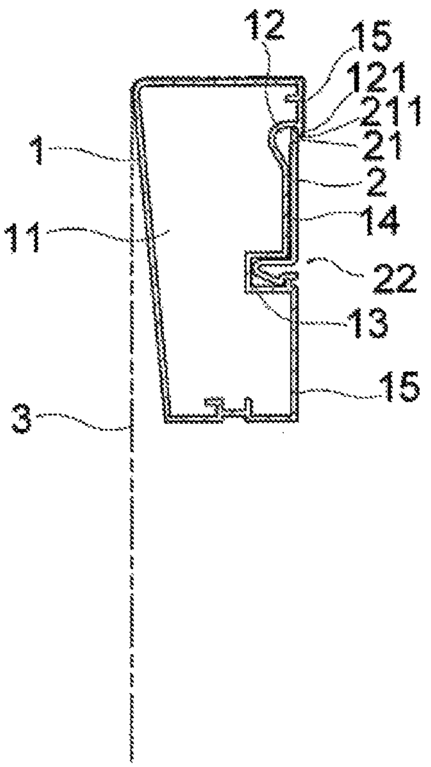

That is, as shown in FIGS. 2A and 2B, the wedge-shaped protrusions 211 of each fixing pin 2 are pressurized against the canvas 3 on the outside of the outer edge of the canvas 3 surrounding the canvas frame body 1 and pierce the canvas 3 so that the ends of the wedge-shaped protrusions 211 exposedly protrude from the other side of the canvas 3 and are inserted into the fixing groove 12. Next, if the elastic portion 22 of each fixing pin 2 is inserted into the coupling groove 13 to allow the locking projection 222 of the fixing pin 2 to be locked onto the locking protrusion 131, the ends of the wedge-shaped protrusions 211 exposed to the other side of the canvas 3 are locked onto the support protrusion 121 so that the canvas 3 is fixed to the canvas frame P. In more detail, if an angle between the support piece 226 and the elastic piece 221 constituting the elastic portion 22 of the fixing pin 2 is elastically decreased, the elastic portion 22 is inserted into the coupling groove 13 to allow the locking projection 222 to come into close contact with the inner surface of the locking protrusion 131 so that the elastic portion 22 of the fixing pin 2 is fixed to the canvas frame body 1.

Further, the elastic force generated from the elastic portion 22 pushes the fixing pin 2 itself toward the fixing groove 12 of the canvas frame body 1 so that the wedge-shaped protrusions 211 of the fixing pin 2, which have pierced the canvas 3 in such a way as to be exposed to the other side of the canvas 3, are moved over the underside of the support protrusion 121 formed on the inlet of the fixing groove 12 and thus lockedly fixed to the support protrusion 121.

Accordingly, the top and bottom of the fixing pin 2 are locked onto the support protrusion 121 and the locking protrusion 131 of the canvas frame body 1 so that the fixing pin 2 does not escape outward from the canvas frame body 1 and the canvas 3 fixed to the fixing pin 2 is fixed in position.

Further, if the extension protrusion 223 of the fixing pin 2 fixed to the canvas frame body 1 is pushed toward the support piece 226 to allow the angle between the support piece 226 and the elastic piece 221 to be decreased, the locking coupling between the locking projection 222 and the locking protrusion 131 is released to cause the elastic portion 22 to escape from the coupling groove 13 so that the fixing pin 2 is separated from the canvas frame body 1.

Furthermore, if the removal hole 225 is formed on the bending portion adapted to form the support piece 226, a tool such as a hook (not shown) is inserted into the removal hole 225 to separate the fixing pin 2 from the canvas frame body 1.

Moreover, the body of the fixing pin 2 is bentedly formed to have given elasticity, and at the time when the canvas 3 is fixed, accordingly, the body of the fixing pin 2 is pressurized against the edge of the canvas 3 to fix the canvas 3 more firmly. If the locking projection 222 of the elastic portion 22 that is inserted into the coupling groove 13 is separated from the locking protrusion 131, the elastic portion 22 is easily separated from the coupling groove 13 by means of the restoring force of the bent body of the fixing pin 2.

Further, the canvas frame body 1 is configured to have the support wall 14 located at a lower height than the frame wall 15 as the rear wall thereof, and accordingly, the fixing pin 2 coming into close contact with the support wall 14 in such a way as to be coupled thereto does not protrude outward from the frame wall 15 of the canvas frame body 1.

EXPLANATIONS OF REFERENCE NUMERALS

P: Canvas frame 1: Canvas frame body
11: Hollow portion 12: Fixing groove
121: Support protrusion 13: Coupling groove
131: Locking protrusion 14: Support wall
15: Frame wall 2: Fixing pin
21: Fixing protruding portion 211: Wedge-shaped protrusion
22: Elastic portion 221: Elastic piece
222: Locking projection 223: Extension protrusion
225: Removal hole 226: Support piece
3: Canvas

The invention claimed is:

1. A canvas fixing device for an aluminum canvas frame, comprising: canvas frame bodies (1) each made of a light-weight metal by means of extrusion molding and having a hollow portion (11) formed therein, a fixing groove (12) formed on a rear surface thereof and having a support protrusion (121) protruding from a top side inlet thereof, a coupling groove (13) formed on the rear surface thereof under the fixing groove (12) and having a locking protrusion (131), and a support wall (14) formed between the fixing groove (12) and the coupling groove (13) and having a lower height than a rear wall thereof; and a plurality of fixing pins (2) molded with a thin plate and having a fixing protruding portion (21) and a plurality of wedge-shaped protrusions (211) formed on a top side thereof and an bent elastic portion (22) formed on a bottom side thereof, the elastic portion (22) having a support piece (226) formed by bending the bottom of the fixing pin (2), an elastic piece (221) formed by bending the end of the support piece (226), and an extension protrusion (223) extending from the elastic piece (221) and having a locking projection (222) protruding therefrom, wherein the wedge-shaped protrusions (211) of each fixing pin (2) are pressurized against a canvas (3) on the outside of an outer edge of the canvas (3) surrounding the corresponding canvas frame body (1) and pierce the canvas (3), so that ends of the wedge-shaped protrusions (211) are exposed from the other side of the canvas (3) and inserted into the fixing groove (12), and the elastic portion (22) of each fixing pin (2) is inserted into the coupling groove (13) to allow the locking projection (222) of the fixing pin (2) to be locked onto the locking protrusion (131), thereby allowing the canvas (3) to be fixed to the aluminum canvas frame (P).

2. The canvas fixing device according to claim 1, wherein each canvas frame body (1) has the locking protrusion (131) protruding from a bottom side inlet of the coupling groove (13), and each fixing pin (2) has the extension protrusion (223) formed by extending the elastic piece (221) in such a way as to have the locking projection (222) protruding therefrom so that the locking projection (222) of the fixing pin (2) inserted into the coupling groove (13) is locked onto the locking protrusion (131).

3. The canvas fixing device according to claim 1, wherein the fixing protrusion portion (21) of the fixing pin (2) has the plurality of wedge-shaped protrusions (211) protruding sharply therefrom.

4. The canvas fixing device according to claim 1, wherein the fixing pin (2) has a removal hole (225) formed on a bent portion adapted to form the support piece (226).

5. The canvas fixing device according to claim 1, wherein a body of the fixing pin (2) is formed by bending.

6. The canvas fixing device according to claim 1, wherein the support wall (14) formed between the fixing groove (12) and the coupling groove (13) of each canvas frame body (1) has a lower height than a frame wall (15) of the canvas frame body (1).

* * * * *